United States Patent

Stepanov et al.

[11] Patent Number: 5,986,876
[45] Date of Patent: Nov. 16, 1999

[54] DOUBLE-LAYER CAPACITOR

[75] Inventors: Aleksei Borisovich Stepanov; Igor Nikolaevich Varakin; Vladimir Vasilievich Menukhov, all of Saratov, Russian Federation

[73] Assignee: Aktsionernoe Obschestvo Zakrytogo Tipa "Elton", Moscow, Russian Federation

[21] Appl. No.: 08/817,253

[22] PCT Filed: Aug. 14, 1995

[86] PCT No.: PCT/RU95/00171

§ 371 Date: Apr. 11, 1997

§ 102(e) Date: Apr. 11, 1997

[87] PCT Pub. No.: WO97/07518

PCT Pub. Date: Feb. 27, 1997

[51] Int. Cl.$^6$ ............................... H01G 9/00; H01G 9/04
[52] U.S. Cl. ..................... 361/502; 361/503; 361/508; 361/516
[58] Field of Search ........................... 29/25.03; 361/303, 361/304, 324, 305, 502, 503, 505, 512, 522, 526, 524, 328, 322, 321.1, 508, 509, 518, 519; 429/59–62, 209, 210, 213, 11, 235

[56] References Cited

U.S. PATENT DOCUMENTS

| | | | |
|---|---|---|---|
| 3,691,433 | 9/1972 | Garstang | 361/524 |
| 4,313,084 | 1/1982 | Hosokawa et al. | 323/370 |
| 4,523,255 | 6/1985 | Rogers | 361/516 |
| 4,626,964 | 12/1986 | Azuma et al. | 361/502 |
| 4,683,516 | 7/1987 | Miller | 361/328 |
| 4,697,224 | 9/1987 | Watanabe et al. | 361/502 |
| 4,713,731 | 12/1987 | Boos et al. | 361/516 |
| 5,541,019 | 7/1996 | Anani et al. | 429/59 |

FOREIGN PATENT DOCUMENTS

| | | |
|---|---|---|
| 32 10 420 | 9/1983 | Germany . |
| 3801719 | 8/1988 | Germany . |
| 84/00246 | 1/1984 | WIPO . |

OTHER PUBLICATIONS

Hahn, G., et al, "Elektrische Doppelschichtkondensatoren für die Speicherpufferug," *Radio Fernsehen Elektronik*, Berlin 39 (1990), pp. 70–80.

Halliop, Wojtek and John Stannard, "Low Cost Supercapacitors," *Third international Seminar on Double Layer Capacitors and Similar Energy Storage Devices*, Dec. 6–8, 1993, (7 pages).

Sekido, Satoshi, et al, "Liquid Electrolyte Double–Layer Capacitor Gold Capacitor", *National Technical Report*, vol. 26, No. 2, Apr. 1980, pp. 220–230.

*Primary Examiner*—Kristine Kincaid
*Assistant Examiner*—Anthony Dinkins
*Attorney, Agent, or Firm*—McDermott, Will & Emery

[57] ABSTRACT

The present invention relates to electrical engineering and can find application for making devices accumulating electric energy.

The invention has for its object to improve the electrical characteristics of double-layer capacitors. To this aim, use is made of a nickel-oxide electrode in pair with an electrode made of a fibrous carbonic material, as well as of an aqueous-alkaline or aqueous-carbonate electrolyte. To obtain a power capacity of the capacitor, the carbonic material one of the electrodes is made from is nickel-copper-plated.

5 Claims, No Drawings

DOUBLE-LAYER CAPACITOR

TECHNICAL FIELD

The present invention relates to electrical engineering and can find application for making capacitors accumulating electric energy which are applicable as power sources in diverse apparatus and devices, e.g., watches, computers, TV sets, radio receivers, and so on, as well as in emergency power supply systems and for starting internal combustion engines, e.g., motor-vehicle ones.

More specifically the present invention relates to capacitors called double electric-layer capacitors.

BACKGROUND ART

Double-layer capacitors with liquid electrolyte and electrodes made of diverse materials having large specific surface are known in the present state of the art (cf. U.S. Pat. Nos. 4,3.13,084 of 1982 and FRG Patent 3,210,420 of 1983). Best results are attained when using various activated carbons as the material of electrodes. Specific capacity of such capacitors exceed 2 F/cu.cm, while use of aprotic electrolytes enables their working voltage to be increased up to 2 or 3 V (cf. U.S. Pat. No. 4,697,224 of 1987; Nat. Tech. Report, 1980, 26 # 2, pp.220–230).

However, use of carbonic materials and organic solvents ensures against obtaining high power characteristics of double-layer capacitors that are sometimes necessary, due to high internal resistance caused by low conductance of carbon and electrolyte. Increased charge-discharge current values of double-layer capacitors is attained by further improvements in construction of capacitor electrodes due to, e.g., the use of electrically conducting binder additives and of fibrous carbonic materials (cf. Carbon, 1990, 28 # 4, pp.477–482; Radio-Fernsehen-Elektron, 1990, 39 # 2, pp.77–800).

The most closely pertinent to the present invention in terms of its technical essence and the attainable effect is a double-layer capacitor made of activated carbon fibers and having polarizable electrodes, as described by W. Halliop et al. (cf. Low Cost Supercapacitors. Third International Seminar on double-layer capacitors and similar energy storage devices. Florida, 1993). The capacitors described therein are cylinder-shaped, 7 or 13 mm in diameter and 27 mm high; they feature a working voltage of 1.8 V, a capacity from 0.1 to 10 F, and discharge current up to 1 A. Tablet-form double-layer capacitors 9.5 mm in diameter and 2.1 mm high are charged to a voltage of 2.4 V and have a capacity of 0.33 F, and an internal resistance of 40 Ohm.

DISCLOSURE OF THE INVENTION

Despite a number of the heretofore-known technical solutions aimed at improving double-layer capacitors, the problem of increasing their specific characteristics still remains to be urgent. Thus, in particular, the levels of electrical parameters attainable in the known capacitors are inadequate for their use for starting internal combustion engines.

The problem mentioned above is solved by the proposed invention described hereinafter described in detail. The essence of the invention resides in that used in the same capacitor are electrodes made of different materials, that is, one of the electrodes is made of a fibrous carbonic material (as in conventional double-layer capacitors), whereas the other capacitor is a nickel-oxide one. It is due to such a combination of electrodes that the inventors were managed quite unexpectedly to improve many times the principal characteristics of the capacitors. Thus, the specific capacity of the capacitor increases 8–10 times. The results obtained can be still more improved when the electrode of a carbonic material is nickel- or copper-coated till a metal content of up to 9–60 wt. %.

A specific feature of the present invention resides also in the electrolyte used, that is, an aqueous solution of a carbonate of hydroxide of an alkali metal with a concentration of 0.01–3 and 3–7 mole/l, respectively.

EXEMPLARY EMBODIMENTS OF THE INVENTION

The essence of the present invention will hereinafter be illustrated in the following exemplary embodiments thereof.

EXAMPLE 1

An electrode made of a carbonic material 0.35 mm thick has a specific surface of 900–2000 sq.m/g. The current collector is made of perforated nickel foil 0.05 mm thick.

A cermet nickel-oxide electrode 0.35 mm thick has a specific capacity of 0.4 ah/cu.cm. A potassium hydroxide solution with a concentration of 6 mole/l is used as electrolyte, and used as the separator is Kapron cloth 0.2 mm thick. The electrode unit is enclosed in a metal casing measuring 50×24×11 mm and is hermetically sealed.

EXAMPLE 2

Unlike Example I the overall dimensions of the double-layer capacitor are 26×8×50 mm.

EXAMPLE 3

Unlike Example 1 the carbonic material is nickel-plated till a nickel content of 20 wt. %, and the overall dimensions of the double-layer capacitor are 50×12×11 mm.

Electrical characteristics of double-layer capacitors mentioned in Examples above are tabulated below in comparison with the estimated prototype parameters, that is, the capacitor described by Halliop et al.

| Example No | Maximum voltage, V | Capacity, F/cu. cm | Internal resistance, Ohm | Energy, J/cu. cm | Self-discharge, % per 40 h |
|---|---|---|---|---|---|
| 1 | 1.4 | 46 | 0.0017 | 45 | — |
| 2 | 1.4 | 40 | 0.015 | 39 | 15 |
| 3 | 1.4 | 43 | 0.0007 | 42 | — |
| Prototype | 1.25 | 5 | — | 4 | 50 |

It follows from the above table that the double-layer capacitors manufactured in accordance with the proposed invention excel many times the prototype as to their electrical characteristics.

We claim:

1. A double-layer capacitor, comprising two electrodes and a liquid electrolyte, one of the electrodes being made of fibrous carbonic material, while the other of the electrodes being a nickel hydroxide positive electrode, the electrolyte being made of an aqueous solution of an alkali-metal carbonate having a concentration ranging from about 0.01 to about 3 moles per liter of the electrolyte.

2. A double-layer capacitor, comprising two electrodes and a liquid electrolyte, one of the electrodes being made of fibrous carbonic material, while the other of the electrodes being a nickel hydroxide positive electrode, the electrolyte being made of an aqueous solution of an alkali-metal hydroxide having a concentration ranging from about 3 to about 7 moles per liter of the electrolyte.

3. A double-layer capacitor, comprising two electrodes and a liquid electrolyte, one of the electrodes being made of fibrous carbonic material metallized by nickel or copper, and having the content of the nickel or copper ranging from about 9 to about 60% by weight of said one of the electrodes, the other of the electrodes being a nickel hydroxide positive electrode.

4. A capacitor as set forth in claim 3, further comprising an electrolyte made of an aqueous solution of an alkali-metal carbonate having a concentration ranging from about 0.01 to about 3 moles per liter of the electrolyte.

5. A capacitor as set forth in claim 3, further comprising an electrolyte made of an aqueous solution of an alkali-metal hydroxide having a concentration ranging from about 3 to about 7 moles per liter of the electrolyte.

* * * * *